(12) United States Patent  (10) Patent No.: US 9,172,767 B2
Morinaga et al.  (45) Date of Patent: Oct. 27, 2015

(54) MOBILE TERMINAL, DATA DISTRIBUTION SERVER, DATA DISTRIBUTION SYSTEM, AND DATA DISTRIBUTION METHOD

(75) Inventors: Yasuo Morinaga, Tokyo (JP); Manabu Ota, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 318 days.

(21) Appl. No.: 13/819,518

(22) PCT Filed: Aug. 8, 2011

(86) PCT No.: PCT/JP2011/068075
§ 371 (c)(1),
(2), (4) Date: Apr. 25, 2013

(87) PCT Pub. No.: WO2012/029509
PCT Pub. Date: Mar. 8, 2012

(65) Prior Publication Data
US 2013/0212230 A1  Aug. 15, 2013

(30) Foreign Application Priority Data
Aug. 31, 2010  (JP) ................................. 2010-194402

(51) Int. Cl.
G06F 15/16  (2006.01)
H04L 29/08  (2006.01)
H04W 4/18  (2009.01)
H04W 4/20  (2009.01)
(Continued)

(52) U.S. Cl.
CPC ............ *H04L 67/32* (2013.01); *G06Q 30/0241* (2013.01); *H04L 67/04* (2013.01); *H04W 4/18* (2013.01); *H04W 4/20* (2013.01); *H04W 76/002* (2013.01); *H04M 11/08* (2013.01); *H04Q 7/32* (2013.01)

(58) Field of Classification Search
USPC ........................................................ 709/219
See application file for complete search history.

(56) References Cited

U.S. PATENT DOCUMENTS

2004/0068634 A1  4/2004  Otsuka
2006/0100978 A1  5/2006  Heller et al.
2007/0271312 A1  11/2007  Heller et al.

FOREIGN PATENT DOCUMENTS

CN  1304953 C  3/2007
EP  0 924 921 A1  6/1999
(Continued)

OTHER PUBLICATIONS

International Search Report Issued Aug. 30, 2011 in PCT/JP11/68075 Filed Aug. 8, 2011.
(Continued)

*Primary Examiner* — Kyung H Shin
(74) *Attorney, Agent, or Firm* — Oblon, McClelland, Maier & Neustadt, L.L.P.

(57) ABSTRACT

A data distribution server, a mobile terminal, and a data distribution method perform distribution of data in consideration of memory capacity. In a mobile terminal, an amount-of-space arithmetic unit carries out an arithmetic operation for an amount of space and a possible amount of space of an object storage unit. Then, in an object distribution server, object data is selected based on the amount of space or the like, and a distribution list is generated and transmitted to the mobile terminal. In the mobile terminal, deletion of object data determined as deletable is performed in order to acquire object data in the distribution list. Acquisition of the object data is then performed.

8 Claims, 11 Drawing Sheets

(51) Int. Cl.
*H04W 76/00* (2009.01)
*G06Q 30/02* (2012.01)
*H04M 11/08* (2006.01)

(56) References Cited

FOREIGN PATENT DOCUMENTS

| EP | 924921 | A1 | * | 6/1999 | ............ H04M 11/08 |
| EP | 1 406 460 | A2 | | 4/2004 | |
| EP | 1406460 | A2 | * | 4/2004 | ............... H04Q 7/32 |
| JP | 2010 44642 | | | 2/2010 | |
| WO | WO 2006/047578 | A2 | | 5/2006 | |

OTHER PUBLICATIONS

International Preliminary Report on Patentability and Written Opinion issued Mar. 21, 2013, in PCT/JP2011/068075 filed Aug. 8, 2011.
The Extended European Search Report issued Jan. 13, 2015, in Application No. / Patent No. 11821527.6-1853 / 2613265.
Combined Office Action and Search Report issued Mar. 11, 2015 in Chinese Patent Application No. 201180041281.X (with English language translation).

* cited by examiner

*Fig.5*

| OBJECT NO. | ATTRIBUTE INFORMATION | LAST DATE AND TIME OF USE | REPRODUCTION FREQUENCY | DATA VOLUME (KB) | ARRANGED POSITION | REPRODUCTION RANGE |
|---|---|---|---|---|---|---|
| 1 | a | 2010/3/xx | 6 | 473 | x,y,z | r2 |
| 2 | b | 2010/3/xx | 20 | 90 | x1,y1,z1 | r3 |
| ⋮ | | | | ⋮ | | |

Fig.7

| OBJECT NO. | ATTRIBUTE INFORMATION | DATE AND TIME OF DISTRIBUTION | DISTRIBUTION FREQUENCY | DATA VOLUME (KB) | ARRANGED POSITION | DISTRIBUTION RANGE | REPRODUCTION RANGE | EMERGENCY FLAG |
|---|---|---|---|---|---|---|---|---|
| 1 | a | 2010/3/xx | 6 | 473 | x,y,z | r | r2 | YES |
| 2 | b | 2010/3/xx | 20 | 90 | x1,y1,z1 | r1 | r3 | NO |
| ⋮ | | | | | | | | |

US 9,172,767 B2

MOBILE TERMINAL, DATA DISTRIBUTION SERVER, DATA DISTRIBUTION SYSTEM, AND DATA DISTRIBUTION METHOD

TECHNICAL FIELD

The present invention relates to a mobile terminal that receives data, a data distribution server that distributes the data, a data distribution system, and a data distribution method.

BACKGROUND ART

With augmented reality (AR) technology in recent years, object data is transmitted, based on the position thereof, to a mobile terminal, and the received object data and imaged data can be synthesized and displayed in the mobile terminal. That is, in the augmented reality technology, arbitrary object data is artificially arranged in actual space, and a mobile terminal present in the space can synthesize and display the object data arranged in the space with actual image data captured with a camera the actual space is captured as the image data utilizing the camera. The object data may be advertisement information of a company, shop, or the like or text data or an image file that a general user has generated.

Generally, as a technique for distributing object data in accordance with position information of a terminal, that described in Patent Literature 1 shown below is known. In this technique, a mobile terminal includes a GPS or the like, and, based on position information thereof, a content distribution server supposedly can perform a distribution process of content data (corresponding to object data).

CITATION LIST

Patent Literature

Patent Literature 1: Japanese Patent Application Laid-Open No. 2010-44642

SUMMARY OF INVENTION

Technical Problem

However, with the technique described in Patent Literature 1, the distribution process is done without taking into consideration the capacity of a memory in the mobile terminal for storing the distributed object data. Thus, a malfunction such as a memory overflow is conceivable.

For example, as the technique described in Patent Literature 1, there is a service in which position information of a terminal itself is notified to a server and an object or content arranged in the surrounding of the terminal itself is received from the server, e.g., a regional information distribution service in which position information is automatically acquired by a GPS and an object or content is acquired in accordance with the position. In this service, acquiring all objects and content is expected to cause a memory overflow.

Also, an overflow is expected in the same manner in a file-casting service, a podcasting service, or the like in which an object or content is downloaded regardless of the position of a terminal, if all objects or the like are downloaded. The same applies to services in which a plurality of content items, e.g., book content, is downloaded at once.

From the above, there is a problem that there may be cases where all of objects and content cannot be stored due to limitations in memory capacity of a terminal not only in the AR technology but in techniques in which an object or content of a large volume is distributed sequentially in real time and a terminal stores the distributed object or content of a large volume.

Thus, in the present invention, it is an object to provide a data distribution server, a mobile terminal, a data distribution system, and a data distribution method with which distribution of data can be performed in consideration of memory capacity in order to solve the problem described above.

Solution to Problem

In order to solve the problem described above, a mobile terminal of the present invention includes: storage means for storing data distributed from a server; arithmetic means for carrying out an arithmetic operation for an amount of space currently available in the storage means and a possible amount of space that is a volume of deletable data in the storage means; notifying means for notifying the server of a data acquisition request showing the amount of space and the possible amount of space for which the arithmetic operation has been carried out by the arithmetic means; receiving means for receiving data and a distribution list that is a list of data other than the data in response to the notification by the notifying means; deleting means for performing deletion of data in order to secure the possible amount of space in the storage means when the distribution list is received by the receiving means; and requesting means for requesting the server for data satisfying a predetermined condition out of the data described in the distribution list to acquire this data, when the deletion of data is performed by the deleting means and a predetermined storage capacity is secured.

In this invention, some data is stored in advance in the storage means, and the server is notified of the data acquisition request showing the amount of space currently available in the storage means and the possible amount of space that is the volume of deletable data in the storage means, prior to the distribution of data. Then, the data and the distribution list are received in response to the notification of position information or the like from the server that distributes data, and the deletion of data is performed to secure the possible amount of space when the distribution list is received. When the deletion of data is performed and the predetermined storage capacity is secured, the request for data satisfying the predetermined condition out of the data described in the distribution list is performed with respect to the server.

Accordingly, even in the case where the remaining capacity of a memory is small in the mobile terminal, acquisition of necessary data can be performed by appropriately determining and deleting deletable data. Thus, a situation where data is not acquired due to lack of memory capacity can be prevented, and appropriate data can be distributed to a user.

Also, in the mobile terminal of the present invention, it may be configured such that the arithmetic means determines the deletable data based on at least one of an elapsed time from a last date and time of use of data stored in the storage means, a reproduction frequency of data, and attribute information of data, and calculates the possible amount of space.

With this invention, deletable data can be determined appropriately to calculate an accurate possible amount of space by determining the deletable data and calculating the possible amount of space based on at least one of the elapsed time from the last date and time of use of the data, the reproduction frequency of the data, and the attribute information of the data.

Also, in the mobile terminal of the present invention, it may be configured to further include measuring means for obtaining position information and such that the notifying means further notifies the server of the position information obtained by the measuring means. Accordingly, data of an object or the like in accordance with the position information can be distributed to the server, and data in accordance with the amount of space of the memory in the mobile terminal can be distributed at that time.

Also, a data distribution server of the present invention includes: data storage means for storing the data; receiving means for receiving, from a mobile terminal, a data acquisition request showing an amount of space of storage means in the mobile terminal and a possible amount of space that is a volume of deletable data in the storage means; extracting means for extracting data as a subject of distribution from the data storage means when the data acquisition request is received by the receiving means, extracting data in an amount corresponding to the amount of space shown in the data acquisition request for data satisfying a predetermined condition out of the extracted data, and generating, for data other than the data in the amount corresponding to the amount of space, a distribution list showing the data; and distributing means for distributing the data extracted by the extracting means and the distribution list generated by the extracting means to the mobile terminal.

In this invention, the data acquisition request showing the amount of space of the storage means in the mobile terminal and the possible amount of space that is the volume of deletable data in the storage means are received from the mobile terminal, the data as the subject of distribution is extracted, and the data in the amount corresponding to the amount of space shown in a data request is extracted for the data satisfying the predetermined condition out of the extracted data. Meanwhile, for the data other than the data in the amount corresponding to the amount of space, the distribution list showing the data is generated. Then, the extracted data and the generated distribution list are distributed to the mobile terminal.

Accordingly, data can be extracted and distributed in accordance with the remaining amount of memory in the mobile terminal, and selection of necessary data can be made by the mobile terminal by sending the distribution list for data other than the extracted data.

Also, in the data distribution server of the present invention, it may be configured such that the data storage means associates and stores data and position information showing a position of the data, the receiving means further receives, from the mobile terminal, position information of this mobile terminal, and, based on the position information of the mobile terminal included in the data acquisition request received by the receiving means and the position information stored in the data storage means, the distribution list generating means extracts corresponding data.

Accordingly, data based on the position of the mobile terminal can be distributed, and distribution of appropriate data such that a memory overflow does not occur in the mobile terminal is made possible.

Also, in the data distribution server of the present invention, it may be configured such that the extracting means extracts data in order of proximity of position shown in the position information of the mobile terminal as the predetermined condition.

With this invention, data can be extracted in order of proximity of position shown in the position information of the mobile terminal as the predetermined condition, and data useful for a user can be selected with a small remaining amount of memory.

In addition, the present invention can be considered as a data distribution system or a data distribution method as described below. An advantageous effect thereof is the same as in the mobile terminal and the data distribution server described above.

A data distribution system of the present invention is a data distribution system including: a data distribution server that distributes data; and a mobile terminal that receives the data distributed from the data distribution server, the mobile terminal including storage means for storing data distributed from a server, arithmetic means for carrying out an arithmetic operation for an amount of space currently available in the storage means and a possible amount of space that is a volume of deletable data in the storage means, notifying means for notifying the server of a data acquisition request showing the amount of space and the possible amount of space for which the arithmetic operation has been carried out by the arithmetic means, receiving means for receiving data and a distribution list that is a list of data other than the data in response to the notification by the notifying means, deleting means for performing deletion of data in order to secure the possible amount of space in the storage means when the distribution list is received by the receiving means, and requesting means for requesting the server for data satisfying a predetermined condition out of the data described in the distribution list to acquire this data, when the deletion of data is performed by the deleting means and a predetermined storage capacity is secured, and the data distribution server including data storage means for storing data, receiving means for receiving, from the mobile terminal, the data acquisition request showing the amount of space of the storage means in the mobile terminal and the possible amount of space that is the volume of deletable data in the storage means, extracting means for extracting data as a subject of distribution from the data storage means when the data acquisition request is received by the receiving means, extracting data in an amount corresponding to the amount of space shown in the data acquisition request for data satisfying a predetermined condition out of the extracted data, and generating, for data other than the data in the amount corresponding to the amount of space, a distribution list showing the data, and distributing means for distributing the data extracted by the extracting means and the distribution list generated by the extracting means to the mobile terminal.

Also, a data distribution method of the present invention is for a data distribution system including a data distribution server that distributes data, and a mobile terminal that receives the data distributed from the data distribution server, the data distribution method including: an arithmetic step in which the mobile terminal carries out an arithmetic operation for an amount of space currently available in storage means and a possible amount of space that is a volume of deletable data in the storage means; a notifying step in which the mobile terminal notifies a server of a data acquisition request showing the amount of space and the possible amount of space for which the arithmetic operation has been carried out in the arithmetic step; a receiving step in which the data distribution server receives, from the mobile terminal, the data acquisition request showing the amount of space of the storage means in the mobile terminal and the possible amount of space that is the volume of deletable data in the storage means; an extracting step in which the data distribution server extracts data as a subject of distribution from data storage means when the data acquisition request is received in the receiving step, extracts data in an amount corresponding to the amount of space shown in the data acquisition request for data satisfying a predetermined condition out of the extracted data, and generates, for data other than the data in the amount corresponding to the amount of space, a distribution list showing the data; a distributing step in which the data distribution server distributes the data extracted in the extracting step and the distribution list generated in the extracting step to the mobile terminal; a receiving step in which the mobile terminal receives the data and the distribution list that is a list of data other than the data in response to the notification in the notifying step; a deleting step in which the mobile terminal performs deletion of data in order to secure the possible amount of space in the storage means when the distribution list is received in the receiving step; and a requesting step in which the mobile terminal requests the server for data satisfying a predetermined condition out of the data described in the distribution list to acquire this data, when the deletion of data is performed in the deleting step and a predetermined storage capacity is secured.

Advantageous Effects of Invention

With the present invention, acquisition of necessary data can be performed by appropriately determining and deleting deletable data, even in the case where the remaining capacity of a memory is small in the mobile terminal. Thus, a situation where data is not acquired due to lack of memory capacity can be prevented, and appropriate data can be distributed to a user.

BRIEF DESCRIPTION OF DRAWINGS

FIG. 5 is an illustrative view of a management table stored in an object management unit 102b.

FIG. 7 is an illustrative view of a management table stored in an object management unit 206b.

DESCRIPTION OF EMBODIMENTS

An embodiment of the present invention will be described with reference to the accompanying drawings. In cases where possible, the same portions are denoted by the same reference signs, and redundant descriptions are omitted.

Figure 1:
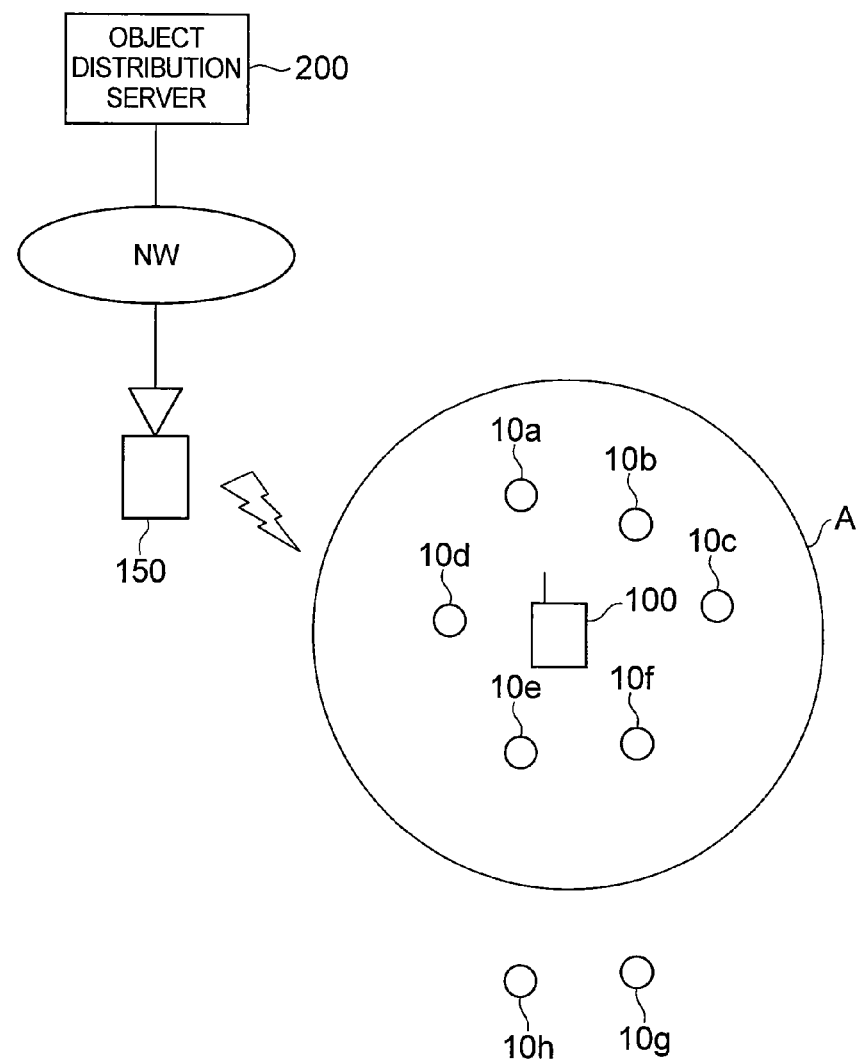
FIG. 1 is a system configuration diagram showing a system configuration example of an object distribution system that distributes object data in this embodiment.

FIG. 1 is a system configuration diagram showing a system configuration example of an object distribution system that distributes object data in this embodiment. The object distribution system is configured to include a mobile terminal 100 and an object distribution server 200.

When an AR application is launched in the mobile terminal 100, position information thereof is transmitted to the object distribution server 200, and object data in accordance with a position thereof is distributed by the object distribution server 200. For example, in the case where the mobile terminal 100 is in an area A as shown in FIG. 1, the object distribution server 200 distributes object data shown as objects 10a to 10f arranged in the area, and the mobile terminal 100 can receive the object data via a base station 150.

The mobile terminal 100 can synthesize and display imaged data imaged by a built-in camera with the object data in a display position in accordance with a position thereof. The object data is shown by an icon such as a GIF file or shown by a text and may be an advertisement, information showing a building, facility, or the like, other image data or text data that a general user has created for oneself, or the like.

Figure 2:
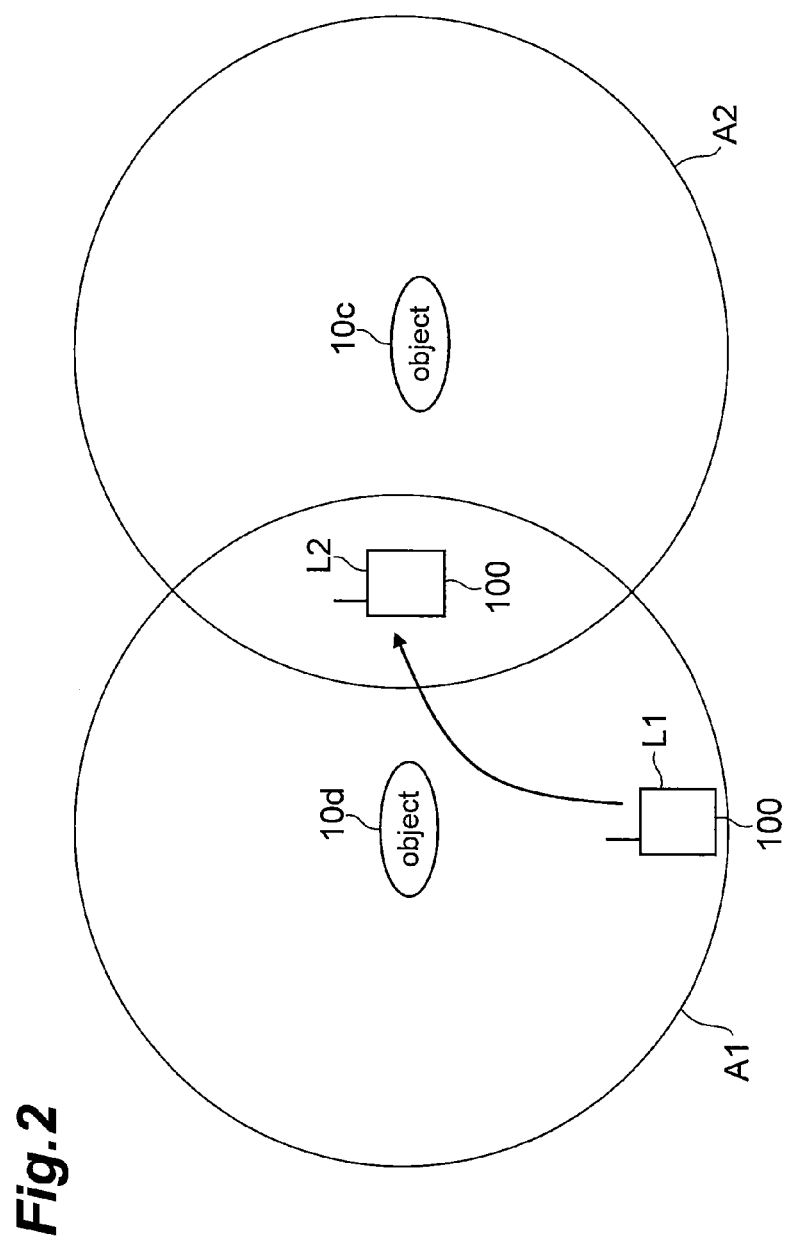
FIG. 2 is an illustrative view showing the relationship of object data and a distribution area.

The area A will be described further in detail. FIG. 2 is an illustrative view showing the relationship of object data and a distribution area. In augmented reality space, a range shown with a predetermined radius with the center being the position (coordinate) of object data is treated as a distribution area. In FIG. 2, an area A1 is defined as the distribution area for the object 10d, and an area A2 is defined as the distribution area for the object 10c in the same manner.

Herein, since a position L1 of the mobile terminal 100 is within the area A1, object data of the object 10d is distributed, and object data of the object 10c is not distributed. In the case where the mobile terminal 100 has moved to a position L2, it is in the area A1 and the area A2 which are distribution areas for the respective objects 10d and 10c, and therefore object data for both is distributed.

In this manner, the distribution area is set for each object data, and, in the case where the position is in the distribution area, the mobile terminal 100 can receive distribution of object data from the object distribution server 200. Note that the approach to distribution areas for object data described above is one example, and this is not limiting. For example, object data arranged in a predetermined radius with the center being the position of the mobile terminal 100 may be the subject of distribution.

Then, in the mobile terminal 100, the object data is displayed with simple image data such as an icon, and a user can reproduce detailed information associated with the icon by clicking or the like of the icon or the like and browse further detailed information. Examples are specific description of a product for an advertisement and detailed description of a building (such as shops or the like therein) for information of a building, facility, or the like.

Figure 3:
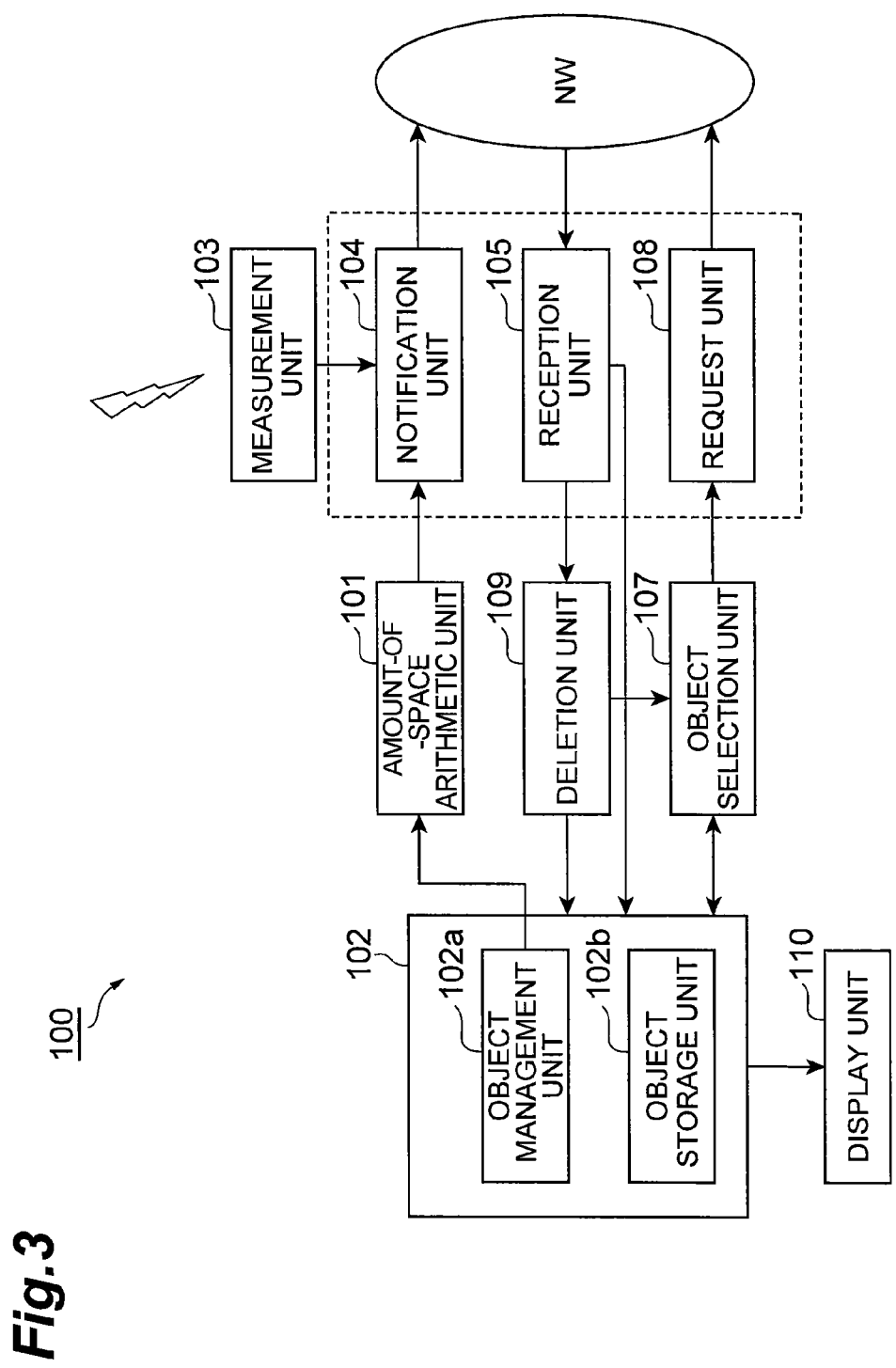
FIG. 3 is a block diagram showing the function of a mobile terminal 100 in this embodiment.

Next, the configuration of the mobile terminal 100 in this embodiment in such an object distribution system will be described. FIG. 3 is a block diagram showing the function of the mobile terminal 100 in this embodiment. As shown in FIG. 3, the mobile terminal 100 is configured to include an amount-of-space arithmetic unit 101 (arithmetic means), a storage unit 102 (an object management unit 102a and an object storage unit 102b (storage means)), a measurement unit 103 (measuring means), a notification unit 104 (notifying means), a reception unit 105 (receiving means), a deletion unit 109 (deleting means), an object selection unit 107, a request unit 108 (requesting means), and a display unit 110.

Figure 4:
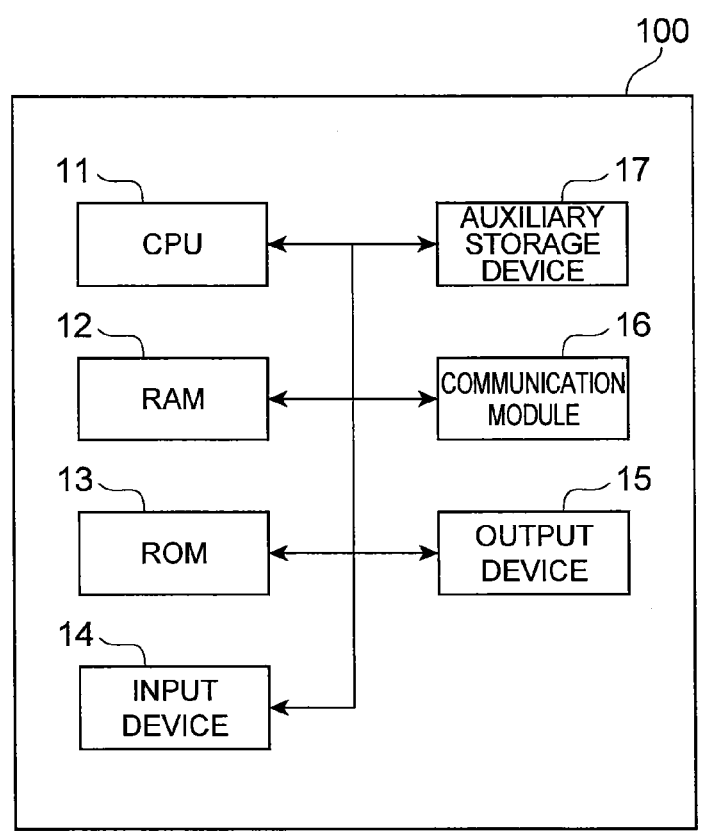
FIG. 4 is a hardware configuration diagram of the mobile terminal 100.

The mobile terminal 100 is configured of hardware shown in FIG. 4. FIG. 4 is a hardware configuration diagram of the mobile terminal 100. Physically, as shown in FIG. 4, the mobile terminal 100 shown in FIG. 3 is configured as a computer system including a CPU 11, a RAM 12 and a ROM 13 that are a main storage device, an input device 14 such as a keyboard and mouse that are an input device, an output device 15 such as a display, a communication module 16 that is a data exchange device such as a network card, an auxiliary storage device 17 such as a hard disk, and the like. The respective functions illustrated in FIG. 3 are achieved by loading predetermined computer software on hardware such as the CPU 11 or the RAM 12 shown in FIG. 4 to operate the input device 14, the output device 15, and the communication module 16 under the control of the CPU 11 and performing reading and writing of data in the RAM 12 or the auxiliary storage device 17. Each function block will be described below based on function blocks shown in FIG. 3.

The amount-of-space arithmetic unit 101 is a portion that carries out an arithmetic operation for an amount of space and a possible amount of space of the storage unit 102. The storage unit 102 stores object data and object management data that manages the same, and the amount-of-space arithmetic unit 101 carries out an arithmetic operation for the capacity in which new object data can be stored in the storage unit 102. More specifically, the amount-of-space arithmetic unit 101 calculates the amount of space by carrying out an arithmetic operation for a region that is actually available. Also, the amount-of-space arithmetic unit 101 refers to the object management unit 102a and calculates the possible amount of space by carrying out an arithmetic operation for the volume of deletable object data that satisfy a predetermined condition. As will be described later, the predetermined condition herein is object data with low reproduction frequency, object data for which a predetermined time has elapsed since the last date and time of use, object data with predetermined attribute information, or the like. Also, in addition, it may be such that the distribution area is associated as attribute information with the object management data, an area based on a current position of the mobile terminal 100 and the distribution area stored in the object management data are compared, and, in the case of a mismatch, a stored object is determined as an object outside the area and determined as a deletable object.

As described above, the object storage unit 102b associates and stores an object number that is an identifier of object data and the object data. The object data is an image file to be synthesized with imaged data and displayed on the display unit 110 or various information relating to the object data. The various information is, for example, a name, phone number, address, business hours, or the like of a shop if the object data indicates a shop or, if for an advertisement, information of an advertising slogan, a product name thereof, a company name, or the like.

The object management unit 102b is a portion that stores the object management data and stores, for example, a management table shown in FIG. 5. In FIG. 5, the object management unit 102b describes the object number, the attribute information, the last date and time of use, the reproduction frequency, the data volume showing the data size, the arranged position (coordinate) in real space, and the reproduction range. The object number is an identifier for uniquely identifying object data. The attribute information is information showing the type or distribution area of object data, e.g., information showing a restaurant, showing a historic site for sightseeing, showing the type of object data, or indicating "xx ward, Tokyo" as the distribution area. The last date and time of use is the date and time of the most recent reproduction, and the reproduction frequency is the number of times reproduced. Also, the reproduction range shows the range of the position of the mobile terminal 100 in which reproduction is possible in the mobile terminal 100 and is shown with a radius with the center being the arranged position. The last date and time of use and the reproduction frequency are updated at every use by a user.

The measurement unit 103 is a portion for measuring the position of the mobile terminal 100 with a GPS or the like. When an AR application for performing acquisition and display of object data is launched, the measurement unit 103 regularly acquires position information thereof.

The notification unit 104 is a portion that transmits, to the object distribution server 200, capacity information showing the amount of space and the possible amount of space calculated by the amount-of-space arithmetic unit 101 and an object acquisition request including the position information obtained by the measurement unit 103. The notification unit 104 operates when a position measurement by the measurement unit 103 is performed. Note that an arithmetic process for the amount of space and possible amount of space may be performed by the amount-of-space arithmetic unit 101 in advance or the arithmetic process may be performed in accordance with the timing of notification described above. Also, attribute information of a user may be included in the object acquisition request.

The reception unit 105 is a portion that receives object data and a distribution list from the object distribution server 200. The distribution list describes a list of object numbers (or object names), attribute information, and emergency flags.

The object selection unit 107 is a portion that selects object data satisfying a predetermined condition from the distribution list when the distribution list is received by the reception unit 105. For example, out of the object data described in the distribution list, object data with a predetermined attribute and object data that is given the emergency flag are selected as the subject of acquisition. Also, it may be such that, in the distribution list, object data associated with an indication of being limited information specific to a user is selected or object data showing that freshness information is newest is selected.

Note that although, herein, the object selection unit 107 automatically selects the object data to be acquired based on the distribution list, selection may be made manually by a user. For example, it may be such that the object selection unit 107 causes the distribution list to be displayed or to be synthesized and displayed in a set position of imaged data in the same manner as the object data, and the user selects the same by clicking or the like to select the selected object data as the subject of acquisition.

The request unit 108 is a portion that performs an acquisition request of object data by transmitting an acquisition request including the object number of the object data selected by the object selection unit 107. In accordance with the acquisition request by the request unit 108, a distribution process of the object data is performed in the object distribution server 200.

The display unit 110 is a portion that displays the object data received by the reception unit 105. Note that the display unit 110 does not display all of the received object data but synthesizes and displays, with imaged data, object data located in a range that is set based on an imaging direction of the camera and a display range described in the object management unit 102b.

The deletion unit 109 is a portion that deletes already stored object data in order to store the object data acquired in accordance with the acquisition request by the request unit 108 in the object storage unit 102b. That is, when object data is distributed from the object distribution server 200 in accordance with a request process by the request unit 108, the deletion unit 109 distinguishes deletable object data that is already stored and deletes the object data at that timing. Note that the deletable object data is object data deemed as the subject for the possible amount of space and may be deleted entirely or may be deleted only partially. In the case where only a part is deleted, the object data together with information showing the data volume thereof is transmitted from the object distribution server 200, and only object data necessary to secure capacity may be deleted based on the information.

Figure 6:
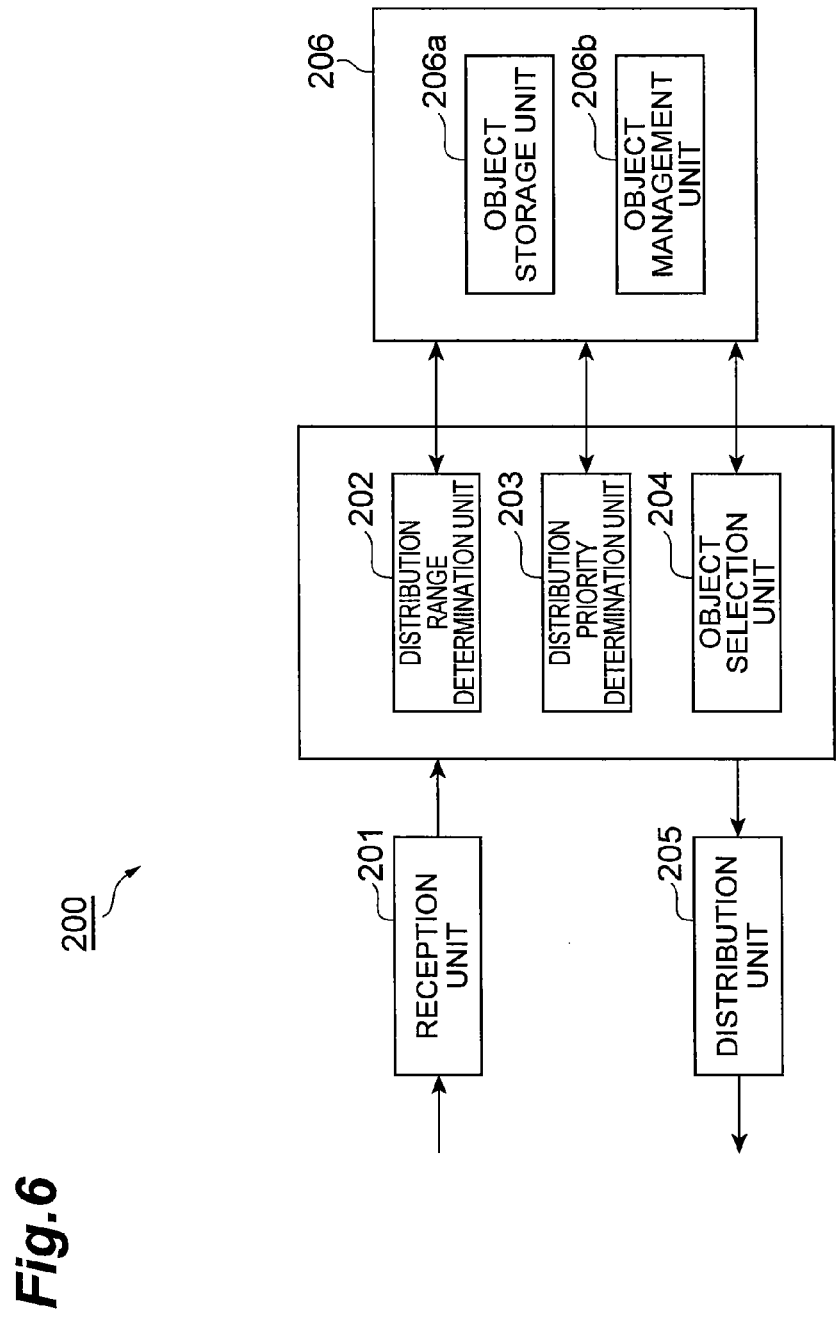
FIG. 6 is a block diagram showing the function of an object distribution server 200.

Next, the object distribution server 200 will be described. FIG. 6 is a block diagram showing the function of the object distribution server 200. As shown in FIG. 6, the object distribution server 200 is configured to include a reception unit 201 (receiving means), a distribution range determination unit 202, a distribution priority determination unit 203, an object selection unit 204 (extracting means), a storage unit 206 (an object storage unit 206a (data storage means) and an object management unit 206b), and a distribution unit 205 (distributing means). In the same manner as the mobile terminal 100, the object distribution server 200 is a computer system formed of a CPU, a ROM, a RAM, and the like, and the respective functions described above are achieved by the CPU operating according to a program stored in the ROM. Respective components of the object distribution server 200 will be described below.

The reception unit 201 is a portion that receives the object acquisition request including the position information and capacity information showing the amount of space and the possible amount of space from the mobile terminal 100. The object acquisition request further includes source information for identifying the mobile terminal 100 and is configured such that a destination of object data can be specified. Also, the object acquisition request may include the attribute information of a user of the mobile terminal 100. In the object distribution server 200, object data to be distributed can be selected using the attribute information, as will be described later.

Also, the reception unit 201 receives the object acquisition request based on the distribution list by the mobile terminal 100. Herein, the object number is described, and the object selection unit 204 of the object distribution server 200 extracts, from the object storage unit 206a, and distributes the object data corresponding to the object number.

The distribution range determination unit 202 is a portion that refers to the object management unit 206b and determines the object data to be distributed based on the position information received by the reception unit 201. That is, the distribution range determination unit 202 determines whether or not the position shown by the position information of the mobile terminal 100 is included in each distribution range of object data stored in the object management unit 206b and determines the object data included in the distribution range as the subject of distribution.

The distribution priority determination unit 203 is a portion that determines the priority of the object data as the subject of distribution. That is, the distribution priority determination unit 203 determines, based on a predetermined condition, the priority of object data in the amount corresponding to the amount of space received from the mobile terminal 100 out of the object data deemed as the subject of distribution in the distribution range determination unit 202. Further, it is a portion that determines the priority of object data described in the distribution list based on a predetermined condition. For example, the distribution priority determination unit 203 determines the order of the object data up to the amount of the amount of space in order of proximity in distance to the position of the mobile terminal 100. When the order of the object data in the amount corresponding to the amount of space is determined, the object data described in the distribution list is next determined. For the object data described in the distribution list, the order of the object data is determined in order of proximity from the position of the mobile terminal 100 out of object data excluding the object data already determined as the subject of distribution. Note that it may be such that the distribution priority determination unit 203 stores the attribute information of the user of the mobile terminal 100 in advance or receives notification together with the position information and determines only object data that matches with the attribute information as the subject of distribution.

The object selection unit 204 is a portion that extracts the object data determined by the distribution range determination unit 202 and the distribution priority determination unit 203 and the object management data and that also generates the distribution list. The distribution list is generated by extracting, from the object management unit 206b, the object number, the attribute information of the object data, and the emergency flag as the subject and the data volume of the object data.

The distribution unit 205 is a portion that distributes the object data and the object management data selected by the object selection unit 204 and the distribution list to the mobile terminal 100 that has made a request therefor.

The object storage unit 206a is a portion that stores object data. The object storage unit 206a associates and stores the object number that is an identifier of object data and the object data that is substantial data thereof.

The object management unit 206b is a portion that stores the object management data. As shown in FIG. 7, the object management unit 206b describes the object number, the attribute information, the date and time of distribution, the distribution frequency, the data volume, the arranged position (coordinate) in real space, the distribution range, the reproduction range, and the emergency flag. The object number is an identifier for uniquely identifying object data, and the attribute information is information showing the type or distribution range of object data. Also, the date and time of distribution is information showing the date and time of distribution by the object distribution server 200, the distribution frequency the frequency (number of times) of distribution to the mobile terminal 100, and the emergency flag the degree of emergency. The mobile terminal 100 that has received the distribution list can acquire object data corresponding to the emergency flag in priority to other object data. The date and time of distribution and the distribution frequency in the object management unit 206b are updated at every distribution to the mobile terminal 100.

In addition, it may be such that the object management unit 206b stores the limited information that is information specific to an individual, the freshness information showing the degree of freshness of information, or the like, and, depending on the mobile terminal 100, the distribution priority determination unit 203 determines the priority to prioritize object data associated with the limited information or determines the priority to prioritize and distribute the newest object data based on the freshness information.

The object data and the object management data stored in the object storage unit 206a and the object management unit 206b are stored appropriately by an operator of the object distribution server 200.

In this manner, the distribution range determination unit 202 determines the object data as the subject of distribution based on management information stored in the object management unit 206b and the position information of the mobile terminal 100. Then, the distribution priority determination unit 203 determines the priority of the object data up to the amount of the amount of space in order of proximity to the position shown by the position information of the mobile terminal 100. Also, the priority of the object data to be described in the distribution list is determined. Then, the object selection unit 204 can perform a selection process of object data based on the determined priority.

Figure 8:
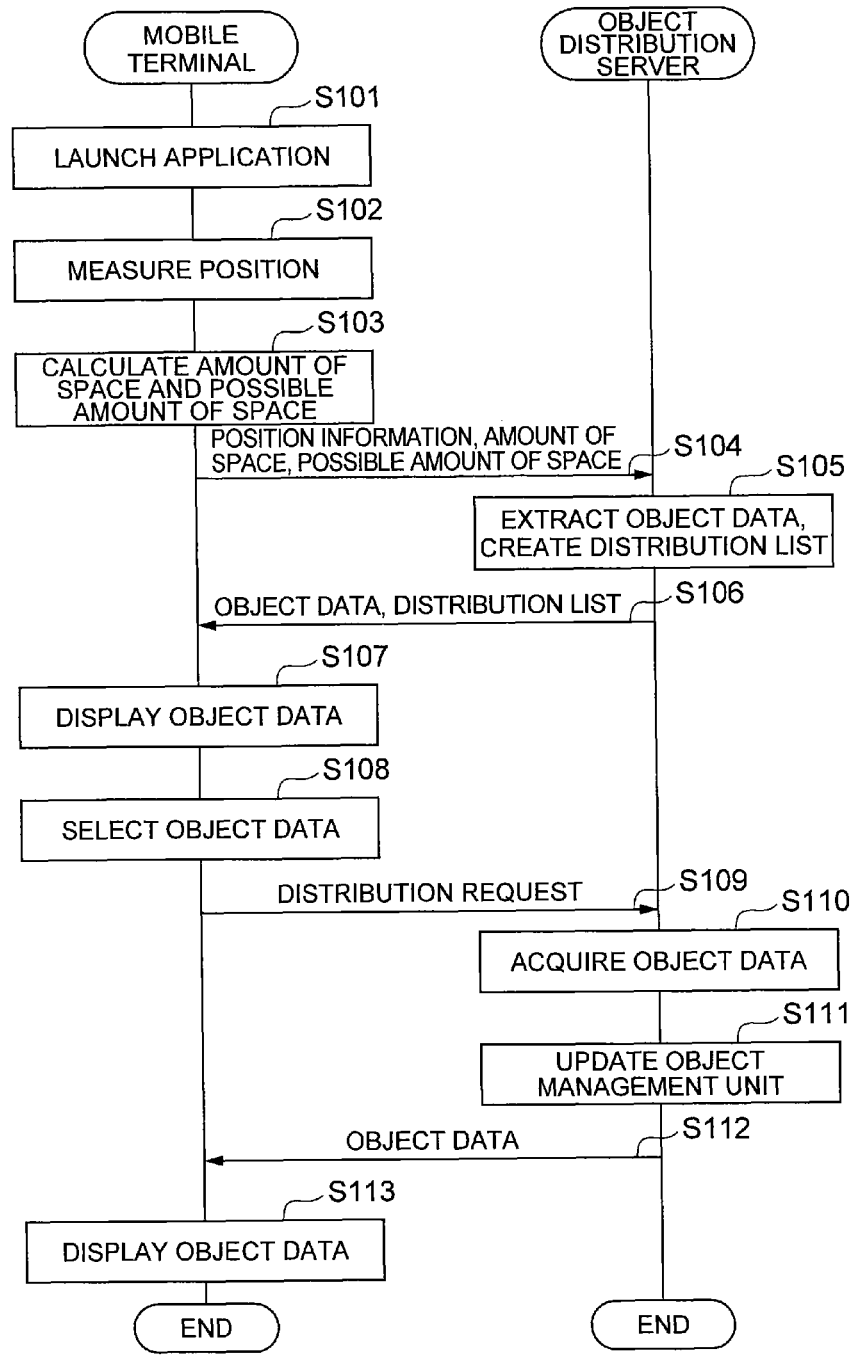
FIG. 8 is a sequence diagram showing a process of the mobile terminal 100 and the object distribution server 200 in the object distribution system.

An object distribution method for the object distribution system configured in this manner will be described. FIG. 8 is a sequence diagram showing a process of the mobile terminal 100 and the object distribution server 200 in the object distribution system. In the process herein, the situation is such that the AR application for object browsing is launched and the object data is synthesized and displayed with the imaged data in the display unit, but this is not limiting. It may also be such that the object data is acquired automatically in accordance with the position of the user without launching the AR application. In that case, a display process is omitted.

First, an application for object data browsing is launched, and imaged data is displayed (S101). At a timing of launch of the application or at a timing of predetermined timekeeping, the position of the mobile terminal 100 is measured by the measurement unit 103 (S102: Measuring step). The amount of space and the possible amount of space in the storage unit 102 are calculated by the amount-of-space arithmetic unit 101 (S103: Arithmetic step). Then, when the amount of space and the possible amount of space are calculated, the position information, the amount of space, and the possible amount of space are transmitted to the object distribution server 200 by the notification unit 104 (S104: Notifying step). Note that although the amount of space and the possible amount of space are calculated after the position measurement herein, the capacity may be calculated in advance before the position measurement.

In the object distribution server 200, an extraction process of the object data and the object management data and creation of the distribution list are performed by the distribution range determination unit 202, the distribution priority determination unit 203, and the object selection unit 204 (S105: Extracting step), when information including the position information, the amount of space, and the possible amount of space are received by the reception unit 201 (Receiving step). The extracted object data and the distribution list are transmitted to the mobile terminal 100 by the distribution unit 205 (S106: Distributing step).

In the mobile terminal 100, the object data and the object management data are respectively stored in the object storage unit 102*b* and the object management unit 102*a* when the object data, the object management data, and the distribution list are received by the reception unit 105, and the object data is displayed in the display unit 110 (S107). Note that the distribution list is also temporarily stored in a storage unit, which is not shown.

Then, in the mobile terminal 100, a selection process of object data satisfying the predetermined condition is performed based on the distribution list by the object selection unit 107 (S108). A distribution request of the object data satisfying the predetermined condition is performed by the object selection unit 107 (S109: Requesting step). Herein, the object data satisfying the predetermined condition is selected and a distribution request including the object number showing the object data is performed by the object selection unit 107. Note that the deletion of the object data determined as deletable is performed prior to the distribution request (Deleting step).

In the object distribution server 200, object data designated by the object number and the object management data are acquired from the object storage unit 206*a* by the object selection unit 204 (S110), when the distribution request is received by the reception unit 201 from the mobile terminal 100. Along with this acquisition process, an update process (update of the date and time of distribution and the distribution frequency) of the object management unit 206*b* is performed (S111). Then, the acquired object data and the object management data thereof are distributed by the distribution unit 205 (S112). In the mobile terminal 100, the distributed object data is further added to the imaged data and displayed (S113).

Figure 9:
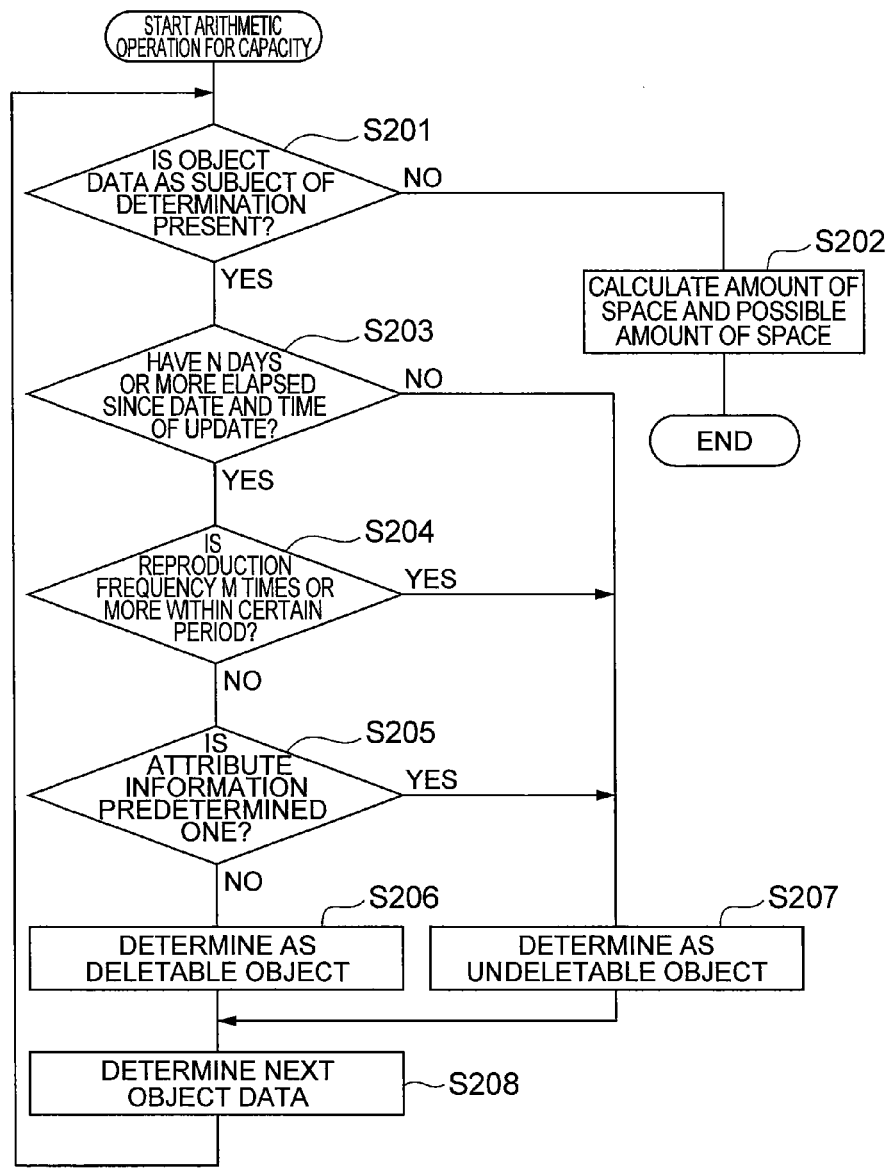
FIG. 9 is a flowchart showing an arithmetic process of an amount-of-space arithmetic unit 101 in the mobile terminal 100.

Next, an amount-of-space arithmetic process in S103 described above will be described in detail. FIG. 9 is a flowchart showing an arithmetic process of the amount-of-space arithmetic unit 101 in the mobile terminal 100.

The position measurement or the like is performed, and the amount-of-space arithmetic process for the storage unit 102 is started prior to the object acquisition request. First, the presence or absence of object data as the subject of assessment is determined by the amount-of-space arithmetic unit 101 (S201). An assessment process with respect to all object data is performed herein, and, when it is determined that object data as the subject of assessment is absent, the volume of object data determined as the subject of deletion is calculated. Then, the amount of space that is actually available and the possible amount of space in the storage unit 102 are respectively calculated (S202).

In the case where the assessment process with respect to all object data is not performed and object data as the subject of assessment is present in S201, the object management unit 102*a* is referred to and the last date and time of use of the object data is checked by the amount-of-space arithmetic unit 101, and whether or not N days or more has elapsed is determined (S203). Herein, in the case where N days or more has not elapsed, it is determined as an undeletable object (S207).

Next, when it is determined that N days or more has elapsed by the amount-of-space arithmetic unit 101, whether or not the reproduction frequency is M times or more within a certain period is determined (S204). Herein, the object management unit 102*b* is referred to and the number of times of the reproduction frequency is checked by the amount-of-space arithmetic unit 101. Then, when it is determined that there are M times or more, it is determined as an undeletable object (S207).

Next, whether or not the attribute information of the object data as the subject of assessment is predetermined attribute information is determined by the amount-of-space arithmetic unit 101 (S205). Herein, the object management unit 102*b* is referred to and the attribute information thereof is checked by the amount-of-space arithmetic unit 101. Then, when it is determined as the predetermined attribute information, it is determined as an undeletable object (S207). For example, in the case where the attribute of the object data deemed as the subject of assessment matches the attribute of the user of the mobile terminal 100, it is an undeletable object. Note that this may be vice versa, and it may be deemed a deletable object in the case of the predetermined attribute information.

Then, in the case where the attribute information of the object data as the subject of assessment is not the predetermined attribute information, it is determined as a deletable object. (S206). Then, next object data is referred to (S208), and these processes are repeated until object data as the subject of assessment becomes absent. When the assessment process is performed with respect to all object data stored in the object management unit 102*b* in S201, an arithmetic operation for the possible amount of space of the object data determined as deletable is performed or the amount of space is calculated and handed over to the notification unit 104 (S202).

Figure 10:
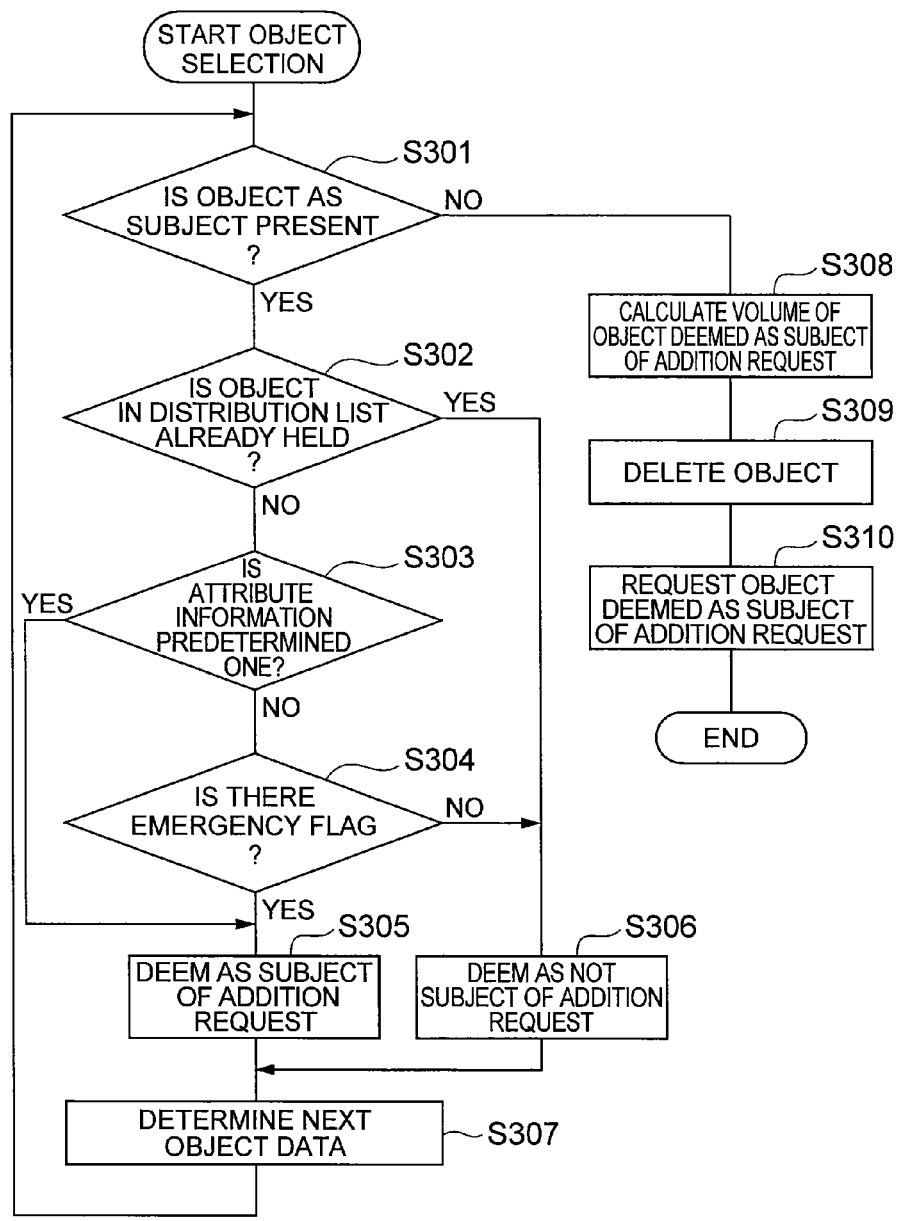
FIG. 10 is a flowchart showing a selection process of an object.

Next, the selection process of object data as the subject of the distribution request of object data will be described. FIG. 10 is a flowchart showing the selection process of object data.

First, the presence or absence of object data as the subject of selection in the distribution list is determined by the object selection unit 107 (S301). In the case where all determination has finished and object data as the subject of selection is absent, a request process of object data as the subject of an addition request is performed subsequently in S308.

Also, in the case where object data as the subject of selection in the distribution list is present, whether or not the object data is already stored in the object storage unit 102b is determined by the object selection unit 107 (S302). Herein, the object management unit 102b is referred to and the presence or absence of storage of the object data is determined by the object selection unit 107. Then, in the case where it is determined as already stored, it is determined as not the subject of addition request.

When it is determined as not stored, whether or not it is predetermined attribute information is determined by the object selection unit 107 based on information described in the distribution list (S303). For example, whether or not the attribute information of the object data matches with the attribute information of the user is determined. When it is determined as not the predetermined attribute information herein, whether or not an emergency flag is given is determined (S304). When it is determined that the emergency flag is absent herein, it is determined as not the subject of addition request (S306).

Also, when it is determined that the emergency flag is present or it is determined as the predetermined attribute information in S303, the object data is determined as the subject of addition request (S305).

Then, determination of the next object data is performed by the object selection unit 107 (S307).

Then, processes from S301 to S307 are performed repeatedly, and, when the selection process with respect to the object data described in the distribution list is finished (S301: No), the volume of object data as the subject of addition request is calculated by the object selection unit 107 (S308). This calculation process is performed based on information showing each volume size of object data described in the distribution list.

Then, when calculation of the volume of the object data as the subject of addition request is performed, optimization of the object storage unit 102b is performed and a deletion process of a deletable object is performed by the deletion unit 109 (S309). Herein, the deletion process of all deletable objects may be performed, or only an amount of the volume of the object data as the subject of addition request may be deleted.

Then, when such an optimization in the storage unit 102 is performed, an acquisition request of the object data as the subject of addition request is performed by the request unit 108 (S310). Herein, by including the object number in the acquisition request, the object distribution server 200 can extract an object corresponding to the object number and perform a distribution process for the mobile terminal 100.

With the process described above, the mobile terminal 100 can acquire and display object data in the vicinity of its own position, and the user can browse the same.

Next, a modification example of this embodiment will be described. In this embodiment described above, necessary object data is selected in the mobile terminal 100 based on the distribution list transmitted from the object distribution server 200. However, in this modification example, necessary object data is transmitted by the object distribution server 200 in consideration of the attribute of the mobile terminal 100.

Figure 11:
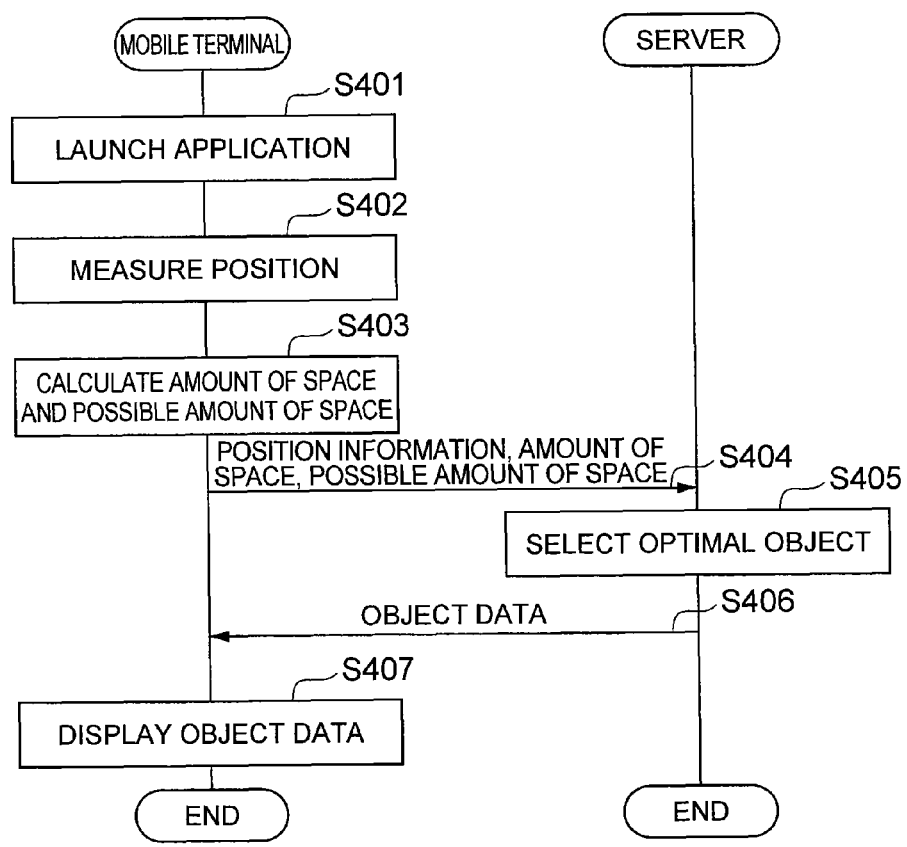
FIG. 11 is a sequence diagram showing a process when the selection process of an object is performed and a distribution process of object data is performed in the object distribution server 200.

FIG. 11 is a flowchart showing that process. First, an application for object browsing is launched, and imaged data is displayed (S401). At a timing of launch of the application or at a timing of predetermined timekeeping, the position of the mobile terminal 100 is measured by the measurement unit 103 (S402). The amount of space and the possible amount of space in the storage unit 102 are calculated by the amount-of-space arithmetic unit 101 (S403). Then, when the amount of space and the possible amount of space are calculated, the attribute information of the user of the mobile terminal 100, the position information, the amount of space, and the possible amount of space are transmitted to the object distribution server 200 by the notification unit 104 (S404). Note that although the amount of space and the possible amount of space are calculated after the position measurement herein, the capacity may be calculated in advance before the position measurement.

In the object distribution server 200, selection of optimal object data is performed based on the attribute information, the position information, the amount of space, and the possible amount of space of the mobile terminal 100 (S405). Specifically, object data in the amount corresponding to the amount of space is extracted in order of proximity based on the position information. Next, for object data in the amount corresponding to the possible amount of space, the object data is deemed the subject of distribution in the case where object data is not stored in the mobile terminal 100 and the object data matches with the attribute information of the user of the mobile terminal 100. Also, even in the case where object data is not stored in the mobile terminal 100 and the object data is not a match with the attribute of the user of the mobile terminal 100, the object data is deemed the subject of distribution if the object data is further given the emergency flag. The object data selected in this manner is distributed to the mobile terminal 100 (S406) and displayed (S407).

By performing selection of optimal object data on the object distribution server 200 side in this manner, processing load in the mobile terminal 100 can be reduced.

Next, advantageous effects of the mobile terminal 100 and the object distribution server 200 in this embodiment will be described. In the mobile terminal 100 in this embodiment, some object data is stored in advance in the object storage unit 102b. Then, prior to the distribution of the object data, e.g., after the AR application is launched and the position measurement by the measurement unit 103 is performed and before the obtained position information is transmitted, the amount-of-space arithmetic unit 101 carries out an arithmetic operation for the amount of space currently available in the object storage unit 102b and the possible amount of space that is the volume of deletable object data in the object storage unit 102b. Then, the notification unit 104 notifies the object distribution server 200 of the object acquisition request including the position information and the like. Then, the reception unit 105 receives the object data and the distribution list from the object distribution server 200 in response to the object acquisition request, and the deletion unit 109 performs deletion of the object data to secure the possible amount of space in the object storage unit 102b when the distribution list is received. When the deletion of the object data is performed and a predetermined storage capacity is secured in the object storage unit 102b, the request unit 108 requests the object distribution server 200 for the object data satisfying the predetermined condition selected by the object selection unit 107 out of the object data described in the distribution list. Then, the object data in accordance with the request for the object data can be acquired.

Accordingly, even in the case where the remaining capacity of a memory such as the storage unit 102 is small in the mobile terminal 100, acquisition of necessary object data can be performed by appropriately determining and deleting deletable object data. Thus, a situation where object data is not acquired due to lack of memory capacity can be prevented, and appropriate object data can be distributed to a user.

Also, with the mobile terminal 100 in this embodiment, the amount-of-space arithmetic unit 101 can determine the deletable object data and calculate the possible amount of space based on at least one of the elapsed time from the last date and time of use of the object data, the reproduction frequency of the object data, and the attribute information of the object data by referring to the object management data stored in the object management unit 102b. Thus, deletable object data can be determined appropriately to calculate an accurate possible amount of space.

Also, with the object distribution server 200 in this embodiment, the reception unit 201 receives, from the mobile terminal 100, the object acquisition request showing the position information of the mobile terminal 100, the amount of space of the object storage unit 102b in the mobile terminal 100, and the possible amount of space that is the volume of the deletable object data in the object storage unit 102b. Then, the object selection unit 204 extracts the object data set based on the position information by the distribution range determination unit 202 and, for the object data determined as satisfying the predetermined condition by the distribution priority determination unit 203 out of the extracted object data, extracts the object data in the amount corresponding to the amount of space shown in the object acquisition request. Meanwhile, for the object data other than the object data in the amount corresponding to the amount of space, the object selection unit 204 generates the distribution list showing the object data. Then, the distribution unit 205 distributes the extracted object data and the generated distribution list to the mobile terminal.

Accordingly, object data can be extracted and distributed in accordance with the remaining amount of memory in the mobile terminal, and selection of necessary object data can be made by the mobile terminal by sending the distribution list for object data other than the extracted object data.

In the object distribution server 200, the object selection unit 204 can extract object data in order of proximity of position shown by the position information of the mobile terminal 100 as the predetermined condition and can select object data useful for a user with a small remaining amount of memory.

Although the AR technology has been described as an application example in this embodiment, this is not limiting. It can be applied to techniques for cases where not all data of objects or content can be stored and can also be applied, for example, to techniques or services below.

For example, it is applicable to a service in which position information of a terminal itself is notified to a server and an object or content arranged in the surrounding of the terminal itself is received from a server, e.g., a regional information distribution service in which position information is automatically acquired by a GPS and an object or content is acquired in accordance with the position.

Also, it can also be applied in the same manner to a filecasting service, a podcasting service, or the like in which an object or content is downloaded regardless of the position of a terminal.

Further, it can also be applied in the same manner to services in which a plurality of content items, e.g., book content, are downloaded at once.

REFERENCE SIGNS LIST

100: Mobile terminal, 101: Amount-of-space arithmetic unit, 102: Storage unit, 102a: Object management unit, 102b: Object storage unit, 103: Measurement unit, 104: Notification unit, 105: Reception unit, 107: Object selection unit, 108: Request unit, 109: Deletion unit, 110: Display unit, 150: Base station, 200: Object distribution server, 201: Reception unit, 202: Distribution range determination unit, 203: Distribution priority determination unit, 204: Object selection unit, 205: Distribution unit, 206: Storage unit, 206a: Object storage unit, 206b: Object management unit.

The invention claimed is:

1. A mobile terminal comprising:
storage module that stores data distributed from a server;
circuitry configured to carry out an arithmetic operation to calculate an amount of space currently available in the storage module and a possible amount of space that is a volume of deletable data in the storage module;
a transmitter configured to notify the server of a data acquisition request indicating the amount of space and the possible amount of space for which the arithmetic operation has been carried out by the circuitry; and
a receiver configured to receive data and a distribution list that is a list of data other than the data in response to the notification, wherein
the circuitry is configured to
perform deletion of data in order to secure the possible amount of space in the storage module when the distribution list is received by the receiver; and
request data from the server satisfying a predetermined condition out of the data described in the distribution list to acquire the data, when the deletion of data is performed and a predetermined storage capacity is secured.

2. The mobile terminal according to claim 1, wherein the circuitry is configured to determine the deletable data based on at least one of an elapsed time from a last date and time of use of data stored in the storage module, a reproduction frequency of data, and attribute information of data, and calculate the possible amount of space.

3. The mobile terminal according to claim 1, further comprising:
a measuring module that obtains position information, wherein
the transmitter is configured to notify the server of the position information obtained by the measuring module.

4. A data distribution server comprising:
a data storage module that stores data;
a receiver configured to receive, from a mobile terminal, a data acquisition request showing an amount of space of storage module in the mobile terminal and a possible amount of space that is a volume of deletable data in the storage module;
circuitry configured to:
extract data as a subject of distribution from the data storage module when the data acquisition request is received by the receiver;
extract data in an amount corresponding to the amount of space shown in the data acquisition request for data satisfying a predetermined condition out of the extracted data; and generate, for data other than the data in the amount corresponding to the amount of space, a distribution list showing the data; and a transmitter configured to distribute the data extracted by the circuitry and the distribution list generated by the circuitry to the mobile terminal.

5. The data distribution server according to claim 4, wherein the data storage module associates and stores data and position information showing a position corresponding to the data, the receiver receives, from the mobile terminal, position information of the mobile terminal, and based on the position information of the mobile terminal included in the data acquisition request received by the receiver and the position information stored in the data storage module, the circuitry extracts corresponding data.

6. The data distribution server according to claim 5, wherein the circuitry is configured to extract data in order of proximity of position shown in the position information of the mobile terminal as the predetermined condition.

7. A data distribution system comprising:

a data distribution server that distributes data; and a mobile terminal that receives the data distributed from the data distribution server, the mobile terminal including:

a storage module that stores data distributed from a server;

circuitry configured to carry out an arithmetic operation to calculate an amount of space currently available in the storage module and a possible amount of space that is a volume of deletable data in the storage module;

a transmitter configured to notify the server of a data acquisition request indicating the amount of space and the possible amount of space for which the arithmetic operation has been carried out by the circuitry; and a receiver configured to receive data and a distribution list that is a list of data other than the data in response to the notification, wherein the circuitry is configured to perform deletion of data in order to secure the possible amount of space in the storage module when the distribution list is received by the receiving module; and request data from the server satisfying a predetermined condition out of the data described in the distribution list to acquire the data, when the deletion of data is performed and a predetermined storage capacity is secured, and the data distribution server including:

a data storage module that stores data;

a receiver configured to receive, from the mobile terminal, the data acquisition request showing the amount of space of the storage module in the mobile terminal and the possible amount of space that is the volume of deletable data in the storage module;

circuitry configured to extract data as a subject of distribution from the data storage module when the data acquisition request is received by the receiver;

extract data in an amount corresponding to the amount of space shown in the data acquisition request for data satisfying a predetermined condition out of the extracted data and generate, for data other than the data in the amount corresponding to the amount of space, a distribution list showing the data; and a transmitter configured to distribute the data extracted by the circuitry and the distribution list generated by the circuitry to the mobile terminal.

8. A data distribution method for a data distribution system including a data distribution server that distributes data, and a mobile terminal that receives the data distributed from the data distribution server, the data distribution method comprising:

an arithmetic step in which the mobile terminal carries out an arithmetic operation for an amount of space currently available in a storage module and a possible amount of space that is a volume of deletable data in the storage module;

a notifying step in which the mobile terminal notifies a server of a data acquisition request showing the amount of space and the possible amount of space for which the arithmetic operation has been carried out in the arithmetic step;

a receiving step in which the data distribution server receives, from the mobile terminal, the data acquisition request showing the amount of space of the storage module in the mobile terminal and the possible amount of space that is the volume of deletable data in the storage module;

an extracting step in which the data distribution server extracts data as a subject of distribution from data storage module when the data acquisition request is received in the receiving step, extracts data in an amount corresponding to the amount of space shown in the data acquisition request for data satisfying a predetermined condition out of the extracted data, and generates, for data other than the data in the amount corresponding to the amount of space, a distribution list showing the data;

a distributing step in which the data distribution server distributes the data extracted in the extracting step and the distribution list generated in the extracting step to the mobile terminal;

a receiving step in which the mobile terminal receives the data and the distribution list that is a list of data other than the data in response to the notification in the notifying step;

a deleting step in which the mobile terminal performs deletion of data in order to secure the possible amount of space in the storage module when the distribution list is received in the receiving step; and a requesting step in which the mobile terminal requests the server for data satisfying a predetermined condition out of the data described in the distribution list to acquire this data, when the deletion of data is performed in the deleting step and a predetermined storage capacity is secured.

* * * * *